Aug. 17, 1937.　　　A. A. GRINNELL　　　2,090,579
SEAT CONSTRUCTION
Filed Oct. 23, 1933　　　2 Sheets-Sheet 1
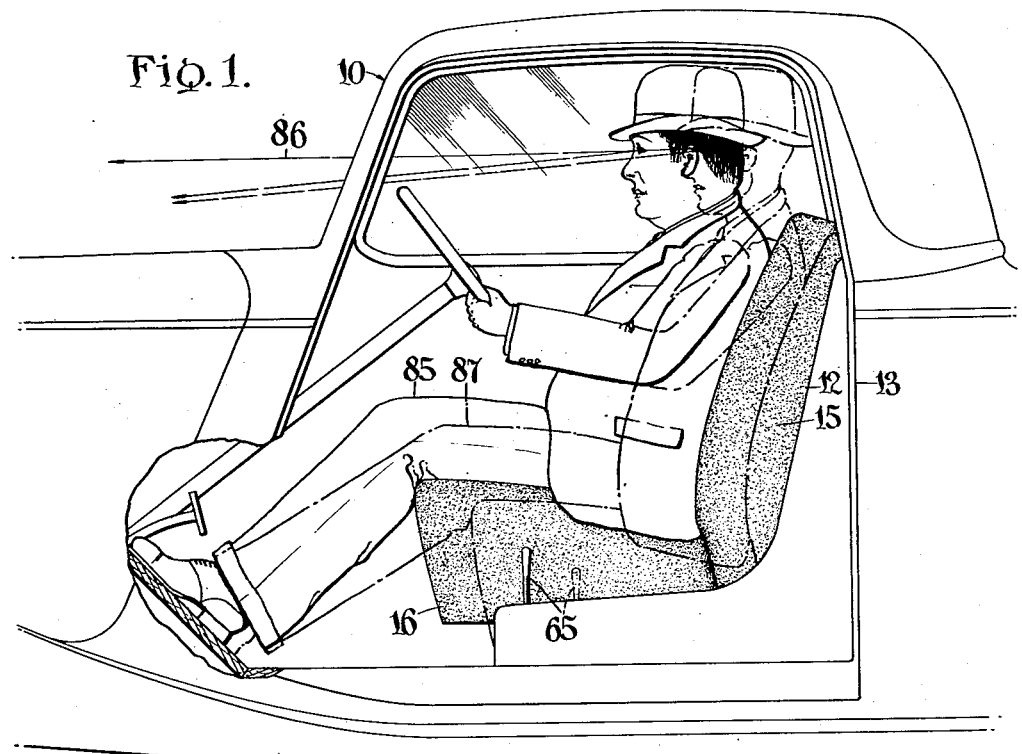
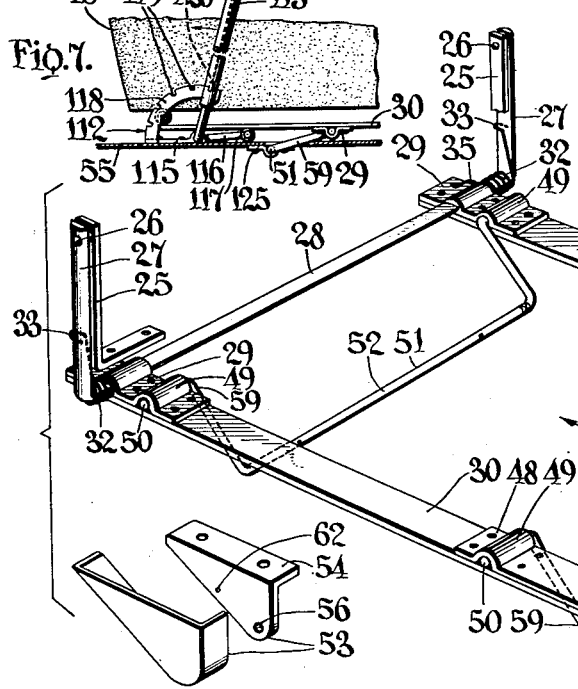
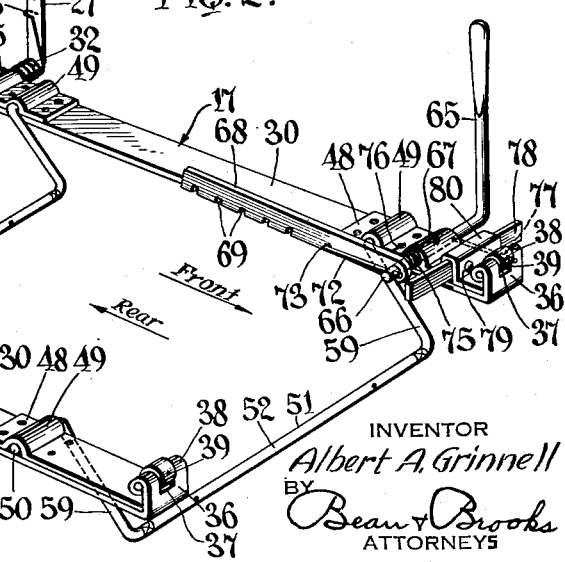
INVENTOR
Albert A. Grinnell
BY Bean & Brooks
ATTORNEYS

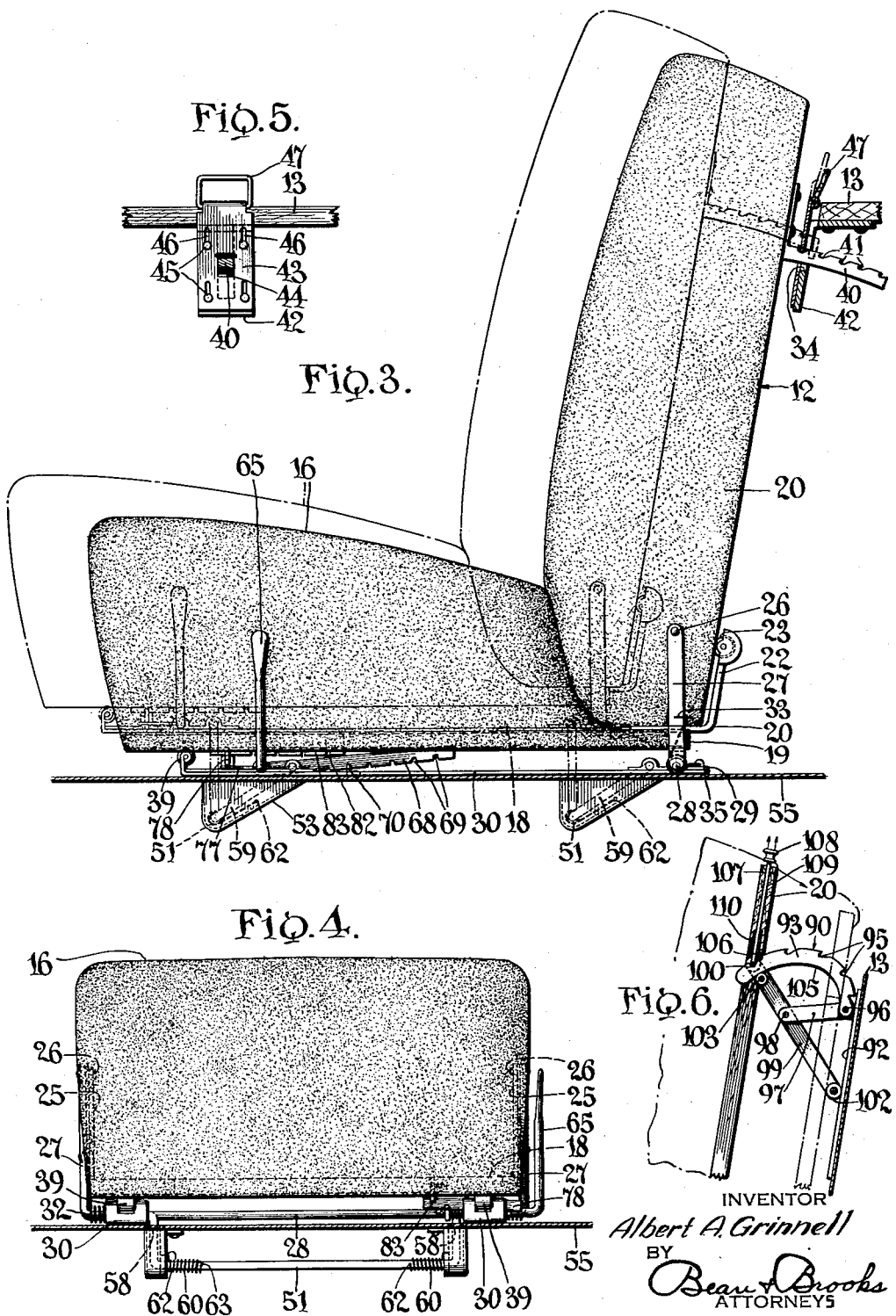

Patented Aug. 17, 1937

2,090,579

UNITED STATES PATENT OFFICE 2,090,579

SEAT CONSTRUCTION

Albert A. Grinnell, Medina, N. Y., assignor to Whedon, Inc., Medina, N. Y.

Application October 23, 1933, Serial No. 694,819

9 Claims. (Cl. 155—14)

This invention relates to adjustable seats for vehicles and for other purposes, and it has particular relation to a seat structure wherein supporting members, seat back and bottom can be relatively moved to conform readily to various sizes and physical characteristics of different types of persons and in such manner that various persons can assume upright, reclining or semi-reclining positions with ease and comfort.

Persons traveling in various types of vehicles frequently desire to change their positions to promote ease in driving a vehicle or to counteract tiresomeness which occurs as a result of sitting in one position for an extended length of time. It is known that various types of adjustable structure have been designed heretofore with varying degrees of success.

This invention is concerned with the provision of an improved adjustable seat structure wherein an occupant may adjust the seating elements to provide comfortable upright seating posture, or the seat may be so adjusted that the seat bottom is moved, as to its angular relation to the horizontal, in order to raise or lower portions thereof according to the physical characteristics of an individual, or the seat bottom may be moved bodily to various horizontal planes, while the seat back can be adjusted forwardly or rearwardly at will.

One of the important advantages of the invention involves the relationship of the steering wheel of the vehicle and the adjustable portions of the seat structure, together with the relationship of these elements to the vehicle control pedals, whereby persons of various degrees of stoutness or other physical peculiarities can be comfortably positioned without interference of parts of the anatomy with the steering wheel, and at the same time, providing entire freedom and ease of manipulation of the person's feet upon the pedals.

Another feature of the invention is exemplified in the selective or optional movement of the seat back and bottom to various positions upwardly or downwardly and rearwardly or forwardly and still retain the same relative position of such seat back and bottom.

The invention is also concerned with a common control mechanism operable to raise or lower the seat in various horizontal positions while the portions of the seat bottom remain in parallelism with the original position, or operable to tilt the seat bottom in either direction from a horizontal position.

In the drawings:

Fig. 1 is a fragmentary elevation of a vehicle having a seat structure embodying the invention incorporated therein;

Fig. 2 is a perspective of a seat control and operating mechanism;

Fig. 3 is a side elevation, on a larger scale, of the seat structure including the controlling mechanism;

Fig. 4 is a front elevation of the structure shown in Fig. 3;

Fig. 5 is a fragmentary elevation of a seat back adjusting device;

Fig. 6 is a fragmentary elevation illustrating another form of seat back adjusting mechanism; and Fig. 7 is a fragmentary side elevation of a manually operable seat actuating mechanism.

In practicing the invention as applied to a vehicle 10, a seat structure 12 is installed in a frame 13 of the vehicle and includes separately assembled seat back 15 and seat bottom 16 supported upon a seat controlling and operating mechanism 17 which is frame-like in structure.

Framework 18 forming the lower portion of the seat bottom has a rear extension 19 for receiving the lower portion of the seat back and is provided with a bracket 20 that has an upwardly extending slightly resilient arm 22. A roller 23 mounted in the upper end of the arm 22 bears against the lower rear portion of the seat back in order to maintain this lower portion in proper relation to the adjacent portion of the seat bottom. It is, of course, to be understood that the arm 22 and roller 23 can be as wide as is necessary for properly maintaining the seat back against displacement, or more than one arm and roller can be appropriately arranged adjacent the lower sides of the seat back.

A pair of stirrup bars 25 rigidly secured to the framework 18 adjacent its rear portion extend upwardly and their upper ends are provided with pivotal connections 26 that are secured to the upper ends of normally upright arms 27 of a transverse rocker 28. Opposite horizontal portions of the rocker are rotatably mounted in bearing plates 29 that are secured to corresponding end portions of oppositely disposed substantially parallel frame members 30 of the controlling mechanism 17. Thus the rear portion of the seat bottom is suspended through the stirrup bars 25 from the upper ends of the rocker arms 27. Torsion springs 32 having their end portions 33 and 35 bearing under torsional force against the plates 29 and arms 27 respectively, tend to maintain the arms 27 of the rocker in an upright position.

The forward ends of the frame members 30 have upwardly turned flanges 36 that are recessed or bifurcated, as indicated at 37, and are rolled into barrel form to provide bearings 38 for supporting rollers 39. When the rocker arms 27 are pivoted rearwardly and forwardly the front portion of the seat bottom frame 18 rides upon, and is supported by, the rollers 39, and thus the rocker arms 27 and rollers 39 serve as full supports for the seat bottom upon the control mechanism 17.

The lower portion of the seat back rests upon the rear portion of the seat bottom, and the upper portion of the seat back is provided with a rearwardly extending bar 40 that has a series of notches 41 formed along its upper edge. This bar extends freely through an opening 34 formed in an angular plate 42 that is rigidly mounted upon the vehicle frame 13. A plate slide 43 having a slot 44 in its central portion registering with the opening 34 receives the rearwardly extending bar 40 and the upper wall of the opening in the slide is adapted to engage in any of the notches 41. Suitable fastening means such as bolts 45 extend through guiding slots 46 formed in the slide and provide for vertically guiding the slide into or out of engagement with the notched bar. A suitable ring handle 47 provides for convenient manipulation of the slide. Thus the upper portion of the seat back can be adjusted forwardly and rearwardly while the lower portion thereof remains in substantially the same position upon the seat bottom. On the other hand, the seat bottom can be moved forwardly and rearwardly upon the rollers 39 and rocker arms 27, and the incidental slight downward or upward movement of the bar 40 of the seat back is permitted in the opening 34, which is in slot form. In this operation, the slide 43, under the force of gravity, automatically remains engaged in one of the notches 41. Thus the plate slide 42 can be adjusted upon the notched bar 40 either before or after the adjustment of the seat bottom.

Bearing plates 48 are secured to corresponding end portions of the frame members 30 opposite the ends upon which the bearing plates 29 are mounted, and all of these bearing plates are provided with bearings 49 for rotatably receiving outwardly turned angular bearing portions 50 of a pair of U-shaped rockers 51. Intermediate or bight portions 52 of the rockers are rotatably mounted in sectional casings 53, the sections of which are rigidly secured together by welding, bolting, or the like, and they are provided with flanges 54 that are bolted to a support 55 in the form of a vehicle floor, or other suitable supporting structure. These casings are provided with bearing openings 56 for receiving the bight portions 52 of the rockers, and thus, the entire seat structure is supported by the casings.

Slots 58 formed in the support 55 and registering with the casings are sufficiently wide to receive freely the seat actuating arms 59 of the rockers as they are pivoted about the bearing openings 56. Torsion springs 60 (Fig. 4) having their ends anchored, as indicated at 62 and 63, to the casings and rockers, respectively, tend to maintain the legs 59 in an upright position. From this construction it will be apparent that the entire seat supporting control mechanism 17 is movable upwardly upon the end bearing portions 50 of the rocker arms 59 to various positions between the full line position and the broken line position shown in Fig. 3.

As best shown in Figs. 2 and 3, an angular control lever 65 is provided with a laterally extending portion 66 rotatably mounted in a bearing 67 of one of the front bearing brackets, and a latch 68 has one end secured to the inner end of the lateral extension of the lever. Suitable notches 69 are provided in the outer or free end portion of the latch and these notches are normally engaged with the upper marginal portion of an angle plate 70 that is rigidly secured to the support 55. A resilient rod 72 having one end extending through and rigidly secured to the end portion of the lever maintains the end of the latch thereon, and its other end is bent to provide positive engagement thereof in a notch 73 of the latch. Thus movement of the lever in the bearing 67 in a clockwise direction, as viewed in Fig. 2, raises the latch 68 and releases its notched portion from the angle plate 70. A torsion spring 75 having one end secured to the horizontal portion 66 of the operating lever and its other end 76 resting upon the bearing plate 48 tends to maintain the lever in an upright position.

A second resilient rod 77 is rigidly secured to the horizontal portion of the lever 65 adjacent the outer edge of the bearing 67 and extends oppositely from the rod 72 until its outer end portion is disposed immediately beneath the lower edge of a second latch 78 that is pivotally mounted, as indicated at 79, in a bracket 80 carried rigidly by the frame member 30. This second latch is arranged at substantially right angles to the latch 68 and its inner end is normally disposed in one of the notches 82 formed in a bar 83 that is rigidly secured to the framework 18 at the lower portion of the seat bottom 16. This bar 83 is disposed longitudinally along one of the side portions of the bottom frame 18.

As indicated in the full lines of Fig. 1 a vehicle operator 85 is shown to be a person smaller than the average; hence, the seat construction is adjusted in its upper and forward position, and the eyes are conveniently and properly focused upon the road ahead of the vehicle through approximately the central portion of the windshield of the vehicle along the line of vision indicated at 86. In the event the operator desires to assume a more reclining position, the lever 65 is drawn rearwardly in a clockwise direction (as viewed in Figs. 1 and 3). This action releases the latch 78 from the notched bar 83 and then by drawing the body forwardly the seat bottom can be moved forwardly upon the rollers 39 and the rear of the seat bottom is moved slightly downwardly, as well as forwardly, as the rocker arms 27 are pivoted forwardly. During this operation the connection between the upper adjusting bar 40 and the supporting plate 42 remains substantially unchanged.

On the other hand, in the event a relatively taller person 87, indicated in broken lines in Fig. 1, is seated in the vehicle, it is likewise desirable that the eyes assume substantially the same relative position as that previously described. The line of vision indicated by the lines 86 are thus substantially the same regardless of the size or height of the vehicle operator.

In order to adjust the seat for assuming this desirable position, the slide 43 is first manipulated to provide for rearward movement of the upper portion of the seat back, e. g., the slide is engaged with the notch nearest the rear surface of the seat back. Then the lever 65 is actuated in a counter-clockwise direction (Figs. 1 and 3) to release the notched latch 68 from engagement with the marginal edge of the angle plate 70, and the entire seat structure is carried rearwardly and downwardly upon the rocker arms 59 to the broken line position of Fig. 1, which corresponds to the full line position of Fig. 3. Then the lever 65 is released thus causing the latch 68 and bar 70 to become engaged again, and this operation provides for maintaining the seating structure in a stationary position until further adjustment is desired. The line of vision of the taller person is then approximately along the same level as that of the smaller person and proper unstrained vision of the road through the windshield of the vehicle is insured.

In the last position described for the seat structure or in any position of adjustment upon the rocker arms 59, the seat bottom can be moved forwardly and tilted upon the rollers 39 and rocker arms 27 in the manner previously described. Thus the taller person can assume various postures approaching a reclining position in approximately the same manner as a smaller person without interfering with the proper vision or proper manipulation of the steering wheel or control pedals of the vehicle.

In certain types of vehicles, such as the coach or two door sedan, there is usually very limited space in which seat back adjusting mechanism of the kind shown in Fig. 3 can be located. However, in Fig. 6, there is shown another form of adjusting mechanism 90 which requires relatively small space, and it is adapted to be incorporated in the coach or two door sedan construction mentioned.

This mechanism is supported upon the vehicle frame 13 by means of a plate or strip of metal 92 secured to the inner side thereof and facing the rear portion of the seat back 20. A notched bar 93 having inclined notches 95 formed along an upper edge thereof is substantially in the form of a ratchet segment and has a pivotal connection 96 at one end for securing it to the upper portion of the plate 92. One end of a link 97 is also pivoted to the plate by means of the same pivotal connection 96. The outer end of the link has a pivotal connection 98 for fastening it to an intermediate portion of an actuating bar 99 that has a pivotal connection 100 for suspending its upper end to the rear upper portion of the seat back 20 and its lower end is provided with a roller 102 movable upon the surface of the plate 92. A second roller 103 adjacent the upper end of the actuating bar 99 supports the free end portion of the ratchet bar 93 and an inner curved surface 105 of the bar is movable upon this roller. The seat back has a recess or space 106 in the structure thereof that can be utilized for receiving the pivoted end of the actuating bar 99 and the ratchet bar 93 movable bodily therethrough.

An adjusting rod 107 having a knob 108 at its upper end extends through an opening 109 in the seat back and its lower end is normally disposed in one of the notches 95 of the ratchet bar. A spring 110 connected to and surrounding the lower end portion of the rod normally maintains the lower rod end pressed against the ratchet bar and engaged in one of the notches 95.

By manipulating the knob 108 the ratchet bar 93 can be released and the seat back 20 adjusted to various positions between the full and broken line positions thereof illustrated in Fig. 6. In the broken line position, the link 97 and bars 93 and 99 are collapsed in such relation that they are substantially upright and located partially in the recess 106 of the seat back 20 and against the plate 92. Thus the mechanism provides for adjustment of the seat back commensurate with the adjustment of the seat bottom 16, whereby these seat portions can be adjusted to various positions while still maintaining the same angular relation, or the seat back and seat bottom adjustments can be made separately.

In view of the nature and inclination of the notches 41 and 95 shown in Figs. 3 and 6, respectively, movement of the seat back shown in either figure can be effected in one direction merely by applying sufficient force to the back to cause an action similar to pawl and ratchet action of the notches and notch engaging elements.

Referring to Fig. 7 the same kind of seat supporting mechanism 17 as that previously described is shown, but an additional manually operable mechanism 112 is incorporated in the structure. This mechanism includes a lever 113 accessible to the person seated upon the seat bottom 16 and the lever is mounted for pivotal action in a bearing 115 mounted rigidly upon the vehicle floor or support 55. An integral angular arm 116 of the lever on each side of the seat 16 is provided with a roller 117 that rides upon the lower surface of the frame member 30. A segmental rack bar 118 also mounted upon the vehicle floor is provided with notches 119 that are engaged by a manually operable detent 120 in the lever. Hence, by operating the lever, the seat bottom can be raised to various positions while the rocker arms 59 maintain the proper horizontal position of the seat bottom in the various phases of adjustment. It is apparent that the control mechanism 112 can be used as a substitute for part of the lever mechanism 65 or can be employed in conjunction therewith.

Instead of utilizing the housing 53, suitable bearing plates 125 can be mounted upon the lower surface of the vehicle floor 55, while the rocker arms 59 extend through the floor for operation in substantially the same manner as that described with reference to the other figures of the drawings.

Although only illustrative structures have been shown and described, it will be apparent to those skilled in the art that the invention is not so limited but that various changes may be made without departing from the spirit of the invention or from the scope of the appended claims.

I claim:

1. In a seat structure, a seat bottom and seat back both movable upwardly and forwardly, said seat back resting under the influence of gravity upon the rear portion of the seat bottom, means for adjusting the seat bottom upwardly and forwardly while carrying the lower portion of seat back resting thereon, and adjusting means connected to the upper portion of the seat back for positioning the seat back in various angular positions relative to the seat bottom regardless of the position of the seat bottom within its limits of adjustment.

2. In a seat structure, a seat bottom and seat back both movable upwardly and forwardly, said seat back resting under the influence of gravity upon the rear portion of the seat bottom, means for adjusting the seat bottom upwardly and forwardly while carrying the lower portion of seat back resting thereon, adjusting means connected to the upper portion of the seat back for positioning the adjusted seat back in various angular positions relative to the seat bottom regardless of the position of the seat bottom within its limits of adjustment, and means for varying the relative height of the front and rear portions of the seat bottom.

3. In a seat structure, a seat bottom and seat back both movable upwardly and forwardly, said seat back resting under the influence of gravity upon the rear portion of the seat bottom, means for adjusting the seat bottom upwardly and forwardly while carrying the lower portion of seat back resting thereon, adjusting means connected to the upper portion of the seat back for positioning the adjusted seat back in various angular positions relative to the seat bottom regardless of the position of the seat bottom within its limits of adjustment, and means for tilting the seat bottom forwardly and rearwardly independently of the upward and forward adjusting means of said seat bottom.

4. In a seat structure, a seat supporting actuating frame including rocker arms for moving the frame upwardly and forwardly, means for supporting said rocker arms, a seat bottom carried by said actuating frame, said rocker arms maintaining said frame in substantially horizontal position in all degrees of its movement, means connected to the frame and seat bottom for adjusting the seat bottom upon the frame independently of the movement of the seat supporting frame, and means having connections to the last mentioned means and to the frame for controlling operation of both the actuating frame and said last mentioned means.

5. In a seat structure, a seat bottom normally disposed in a substantially horizontal plane, a rocker having normally upstanding arms pivoted to the rear portion of the seat bottom, frame members connected to the supporting rocker arms, means on the frame members for movably supporting the front portion of the seat bottom, a set of parallel rockers having rocker arms connected to the frame members for carrying said frame members in parallel relation to various positions, means for supporting said parallel rockers, a control device mounted upon one of the frame members, the last mentioned means and the control device having parts cooperating to maintain the frame members positively in various positions, means cooperating with the control device and with the seat bottom for adjusting the first mentioned rocker arms in various positions, and a seat back carried upon the rear portion of the seat bottom, the upper portion of the seat back having means for adjusting the seat back in various relative positions upon the seat bottom.

6. In a seat structure, a seat bottom normally disposed in a substantially horizontal plane, a rocker having normally upstanding arms pivoted to the rear portion of the seat bottom, frame members connected to the supporting rocker arms, means on the frame members for movably supporting the front portion of the seat bottom, a set of parallel rockers having rocker arms connected to the frame members for carrying said frame members in parallel relation to various positions, means for supporting said parallel rockers, a control lever mounted upon one of the frame members, a latch carried by the lever, said latch and last mentioned means having a plurality of selectively engageable parts responsive to movement of the lever for adjusting the frame members in various positions, a second latch pivoted upon one of the frame members, actuating means extending from the lever to the second latch, the second latch and the seat bottom having a plurality of selectively engageable parts responsive to movement of the lever for adjusting the seat bottom to various positions with respect to the frame members, and a seat back carried upon the rear portion of the seat bottom, the upper portion of the seat back having means for adjusting the seat back in various relative positions upon the seat bottom.

7. In a seat structure, a seat bottom movable upwardly and forwardly from a lower position to various substantially horizontal positions of adjustment within predetermined limits, mechanism connected to the seat bottom for carrying the latter in its substantially horizontal positions in various degrees of its movement, means for supporting said mechanism, means connected to said mechanism for positively locking the latter in various positions of adjustment in supporting the seat bottom in various positions of its movement, a seat back having its lower portion removably mounted upon and responsive to movement of the rear portion of the seat bottom in degrees corresponding substantially to degrees of movement of said bottom, said seat back being free from positive connection to said seat bottom whereby the seat back is liftable bodily from the seat bottom, means connected to the seat back for adjusting the upper portion of the latter angularly about the lower mounting thereof regardless of the position of the seat bottom, said means and seat back having coacting parts compensating for the upward phase of movement of said seat back and a support for the latter means.

8. In a seat structure, a substantially horizontal seat bottom movable forwardly and upwardly from a lower predetermined position and movable rearwardly and downwardly from an upper position, mechanism movably supporting the front and rear portions of the seat bottom to carry the latter substantially horizontally in various positions within predetermined limits of movement, a seat back having its lower portion removably mounted upon the rear portion of the seat bottom and being free from positive connection to said seat bottom whereby said seat back is liftable bodily from the seat bottom, said seat bottom and seat back including cooperating means for moving the lower portion of the seat back forwardly and rearwardly in response to forward and rearward movement of the seat bottom regardless of whether the upper portion of the seat back remains substantially stationary or moves bodily in corresponding degree with the movement of the seat bottom, means connected to said seat back for adjusting the upper portion of the latter forwardly and rearwardly independently of, or in corresponding degree with, movement of the seat bottom to its various positions, and a support for the latter means.

9. In a seat structure, a frame, a movable mechanism supporting the frame and being movable therewith, a support upon which the mechanism is mounted, a seat bottom carried upon the frame and being movable with respect thereto, and an adjusting device having first means adjustably connecting said device to the movable mechanism and having second means adjustably connecting said device to the seat bottom, said device including a single actuating means having connections with both of said first and second means and being selectively operable to determine either the position of the seat bottom with respect to said frame or the position of said movable mechanism on said support.

ALBERT A. GRINNELL.